US011686338B2

(12) United States Patent
Rousseaux et al.

(10) Patent No.: US 11,686,338 B2
(45) Date of Patent: Jun. 27, 2023

(54) BLIND RIVET INSERT, A COMPONENT WITH AN INSTALLED BLIND RIVET INSERT AND METHOD FOR INSTALLING SUCH A BLIND RIVET INSERT IN A COMPONENT OPENING

(71) Applicant: Bollhoff Otalu S.A., La Ravoire (FR)

(72) Inventors: Philippe Rousseaux, Saint Baldoph (FR); Norbert Perroud, Curienne (FR); Bastien Billiemaz, Surbaix (FR); Jean-Louis Frison, Randens (FR); Emmanuelle Berlire, Challes les Eaux (FR)

(73) Assignee: Bollhoff Otalu S.A., La Ravoire (FR)

( * ) Notice: Subject to any disclaimer, the term of this patent is extended or adjusted under 35 U.S.C. 154(b) by 0 days.

(21) Appl. No.: 17/773,628

(22) PCT Filed: Mar. 11, 2021

(86) PCT No.: PCT/EP2021/056275
§ 371 (c)(1),
(2) Date: May 2, 2022

(87) PCT Pub. No.: WO2021/190951
PCT Pub. Date: Sep. 30, 2021

(65) Prior Publication Data
US 2022/0381284 A1 Dec. 1, 2022

(30) Foreign Application Priority Data
Mar. 25, 2020 (EP) .................................... 20290032

(51) Int. Cl.
*F16B 37/06* (2006.01)
*F16B 19/10* (2006.01)
*F16B 33/00* (2006.01)

(52) U.S. Cl.
CPC ............ *F16B 37/067* (2013.01); *F16B 19/10* (2013.01); *F16B 33/004* (2013.01)

(58) Field of Classification Search
CPC .... F16B 13/061; F16B 37/067; F16B 19/027; F16B 10/1036; F16B 10/19;
(Continued)

(56) References Cited

U.S. PATENT DOCUMENTS 2,884,099 A * 4/1959 Nenzell ................. F16B 19/008
29/523
3,916,970 A * 11/1975 Owens ................ B60C 15/0226
152/399

(Continued)

FOREIGN PATENT DOCUMENTS

CN 202140399 U 2/2012
CN 203979079 U 12/2014
(Continued)

OTHER PUBLICATIONS

Written Opinion & International Search Report for PCT/EP2021/056275 dated May 19, 2021, (12 pages).

(Continued)

*Primary Examiner* — Flemming Saether
(74) *Attorney, Agent, or Firm* — Reising Ethington P.C.

(57) ABSTRACT

A blind rivet insert having a head forming an annular flange and a shank extending from an underside of the head, and having a head end, a foot end and a bore extending from the head end to the foot end. The insert has a first bore segment near the foot end, provided with an internal thread, and a second bore segment near the head end whose diameter is greater than that of the first bore segment. The underside of the head includes an annular groove adapted for receiving a sealing ring in a mounted condition of the blind rivet insert. An annular retaining shank groove extends circumferen-
(Continued)

Figure 1:
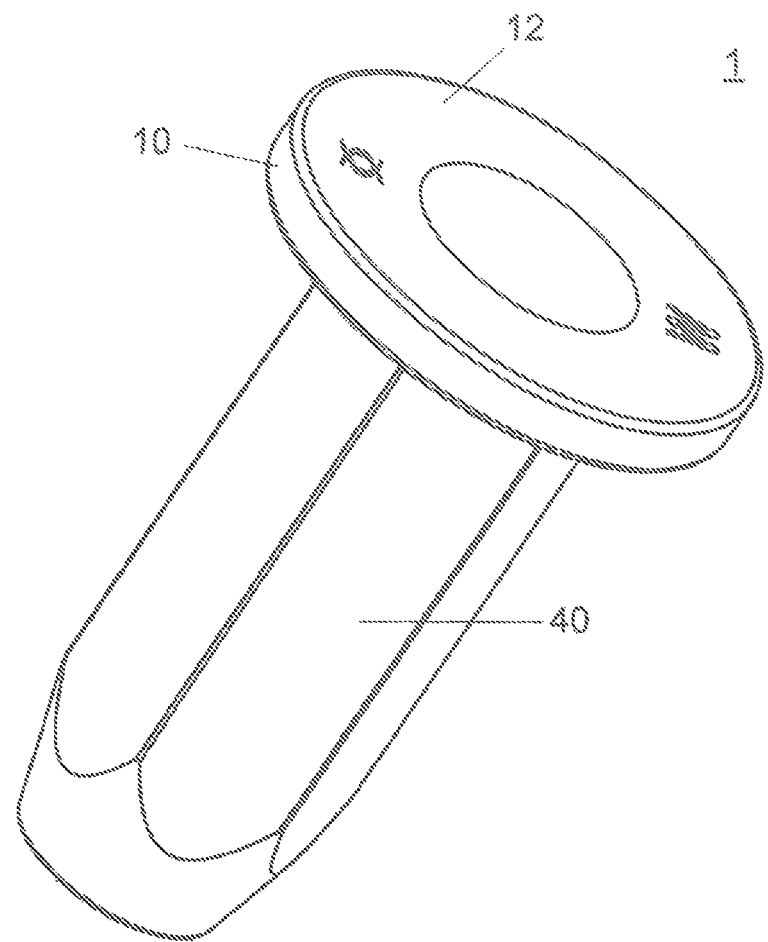

tially around the shank, is arranged adjacent to the underside of the head, and retains the sealing ring in a preloaded position before mounting the blind rivet insert.

17 Claims, 10 Drawing Sheets

(58) Field of Classification Search
CPC .............. F16B 10/1072; F16B 19/1036; F16B 19/1072; F16B 43/001; F16B 33/004; F16J 15/021; F16J 15/028
USPC ............... 411/34, 37, 38, 369, 542; 277/643
See application file for complete search history.

(56) References Cited

U.S. PATENT DOCUMENTS

| | | | | |
|---|---|---|---|---|
| 4,102,030 | A * | 7/1978 | King, Jr. ............. | F16B 19/1063 29/523 |
| 4,170,919 | A * | 10/1979 | Siebol .................. | F16B 19/008 411/43 |
| 5,957,641 | A * | 9/1999 | Bogatz ................. | F16B 33/004 411/48 |
| 7,223,056 | B2 * | 5/2007 | Schneider ............ | F16B 37/067 411/509 |
| 8,297,900 | B2 * | 10/2012 | Sumiya .................. | F02F 7/006 403/408.1 |
| 9,366,278 | B2 * | 6/2016 | Ishida .................. | F16B 33/004 |
| 10,415,621 | B2 | 9/2019 | Muuttonen et al. | |
| 10,920,813 | B2 | 2/2021 | Perroud et al. | |
| 11,408,457 | B2 | 8/2022 | Bartig et al. | |
| 2005/0201844 | A1 | 9/2005 | Davies et al. | |
| 2011/0305540 | A1 * | 12/2011 | Litzinger .............. | F16B 43/001 411/386 |
| 2018/0238369 | A1 | 8/2018 | Perroud et al. | |
| 2021/0087655 | A1 | 3/2021 | Ramasamay et al. | |
| 2021/0246930 | A1 * | 8/2021 | Knechtges ............ | F16B 19/008 |

FOREIGN PATENT DOCUMENTS

| | | |
|---|---|---|
| CN | 110145530 A | 8/2019 |
| EP | 0589144 A1 | 3/1994 |
| EP | 1557577 A2 | 7/2005 |
| EP | 3366932 A1 | 8/2018 |
| EP | 3556875 A1 | 10/2019 |
| JP | H0567890 U | 9/1993 |
| JP | 2019516048 A | 6/2019 |
| KR | 1020170065008 A | 6/2017 |

OTHER PUBLICATIONS

EP Intention to Grant for EP Application No. 20290032.0 dated Feb. 24, 2022, (33 pages).
CN Office Action for CN Application No. 202180006121.5 dated Nov. 21, 2022 (6 pages).
JP Allowance for JP Application No. 2022-524576 dated Nov. 22, 2022 (3 pages).
KR Office Action for KR Application No. 10-2022-7014678 dated Jul. 13, 2022 (16 pages).

* cited by examiner

BLIND RIVET INSERT, A COMPONENT WITH AN INSTALLED BLIND RIVET INSERT AND METHOD FOR INSTALLING SUCH A BLIND RIVET INSERT IN A COMPONENT OPENING

1. TECHNICAL FIELD

The present disclosure is related to a blind rivet insert, such as a blind rivet nut, a component with an installed blind rivet insert and method for installing such a blind rivet insert in a component opening.

2. BACKGROUND

Blind rivet inserts, often used in a configuration of a blind rivet nut, are installed in component openings in order to realize a mounting position for a further component or a periphery part or for the component itself. An external impact of surrounding media, like water, gases or chemical substances, may affect the stability and/or lifetime of the connection or any construction covered by the component. As a consequence, blind rivet nuts are installed in a component opening which might seal the contact interface between the blind rivet nut and the component.

For example, there may be mentioned blind rivet inserts that have a collar and an O-ring placed under the collar as disclosed in EP 3 366 932 A1. In order to maintain the position of the O-ring below the collar or bearing head, an annular groove is provided on the bottom side of the head accommodating a seal, e.g. the O-ring.

Disadvantageously, these inserts do not provide sufficient mechanical strength. Furthermore, the seal is sensitive and can be damaged during insertion of the insert into its destination slot or opening. In addition, such a seal may become detached during mounting the insert on a support. Indeed, the assembly of the inserts can generate vibration, friction, high pressures and shocks that tend to move the joint resulting in loss of the desired seal. This phenomenon is amplified when the inserts are lubricated for automotive needs, or when the inserts are subjected, after installation, to swim in surface treatments at high temperature, or the application of paint or varnish.

It is therefore an object of at least some implementations of the present disclosure to overcome these disadvantages. It is a further object of at least some implementations of the present disclosure to provide a blind rivet insert, as for example a blind rivet nut, in combination with a sealing ring being effectively connected to each other to guarantee a reliable transport and installation of the part combination.

3. SUMMARY

The above object is solved by a blind rivet insert, a component having a blind rivet insert installed, as well as by a setting method for the above blind rivet insert into a component opening. Further embodiments and developments result from the following description, the drawings as well as the appending claims.

The present disclosure provides a blind rivet insert, such as a blind rivet nut. If it is referred in the following to a blind rivet nut, it represents in general possible constructions of the above-mentioned blind rivet insert. The blind rivet insert comprises a bearing head forming an annular flange and a shank extending from an underside of the bearing head and comprising a head end, a foot end and a cylindrical bore extending in lengthwise direction from the head end to the foot end, and having a first bore segment near the foot end, provided with an internal thread, and a second bore segment near the head end whose diameter is greater than the diameter of the first bore segment. The wall surrounding the second bore segment forming a deformable region of the shank, as for example having a reduced wall thickness of the shank in comparison to the foot end section of the shank. The underside of the bearing head comprises an annular underhead groove concentrically arranged to the shank and adapted for receiving a sealing ring in a mounted condition of the blind rivet insert. Furthermore, at least one annular retaining shank groove extends circumferentially around the shank, being arranged adjacent to the underside of the bearing head, for retaining the sealing ring in a preloaded position before mounting the blind rivet insert.

The blind rivet insert is qualified to provide a reliable combination of a blind rivet insert and a sealing ring in order to facilitate the making of a sealed connection between a component and the blind rivet insert. To this end, the blind rivet insert provides a combination of at least two grooves adapted to receive, position, transfer and retain a sealing ring at different positions. According to one embodiment, only one retaining groove may be arranged adjacent to the underside of the bearing head. The annular retaining shaft groove is adapted to position and retain a sealing ring, e.g. an O-ring, onto the outer surface of the shank of the blind rivet insert. At this position, the sealing ring is reliably fixed by a friction connection within said retaining shank groove. Additionally, the positive fit between the sealing ring and the retaining groove may support a reliable fixation of the sealing ring on the shank even if the blind rivet insert is transported as bulk material.

Furthermore, the retaining shank groove at the head end of the shank and the annular underhead groove at the bottom side of the rivet head are positioned in close vicinity to each other. Close vicinity qualifies the fact that the sealing ring may be easily shifted from the retaining groove into the underhead groove to achieve a sealed fixation of the blind rivet insert in a component opening. The term "easily shifting" refers to the fact that no extra efforts or extra tooling may be required to complete the shifting of the sealing ring into the under head groove or at least in a position directly adjacent/below the bottom side of the bearing head, which may be in contact with the bottom side. This shifting of the sealing ring may be realized by the edge of the components opening into which the blind rivet insert is to be installed.

According to a further embodiment, the annular flange of the blind rivet insert has a flange thickness in the lengthwise direction of the blind rivet insert, and the annular retaining shank groove is positioned in a circumferential retaining region of the shank starting at the underside of the annular flange having a maximum width in lengthwise direction equal to the flange thickness.

As already stated above, the only one retaining shank groove and the underhead groove may be closely positioned to each other. The close positioning is emphasized by the fact that the retaining shank groove is situated in a retaining region directly beneath the bottom side of the rivet head. The retaining region may have a maximum extension in the longitudinal direction of the shank starting from the bottom side of the rivet head which may correspond to twice the longitudinal head thickness, and in some implementations, only once the longitudinal head thickness. The retaining section may form part of a non-deformable axial shank region as described below. The longitudinal head thickness is the distance between the bottom side and the top side of the rivet head measured lengthwise of the shank. Based on the close distance between the two grooves, the edge of the component's opening may be able to displace, i.e. shift or roll, the sealing ring from the retaining groove into or close to the underhead groove.

The shank of the blind rivet insert may have a cylindrical outer wall comprising the annular retaining shank groove which has a partially circular cross-section, which may be a semicircular cross-section. According to a further embodiment of the blind rivet nut or insert, the shank has a cylindrical outer shape. As a further shaping of the shank, it may have a polygonal cross sectional shape, as for example a hexagonal shank of a blind rivet nut (see below). Such a variation in the shaping of the shank is generally known, and it may be combined with the above combination of the annular underhead groove and the retaining groove at the shank.

If the shank of the blind rivet insert has a cylindrical outer shape, the annular retaining shank groove may be regularly separated by radial webs defining a plurality of circumferential partial sectors of the retaining shank groove.

The radial webs may extend in circumferential direction within the annular retaining shank groove, thereby partly or completely radially filling the annular retaining shank groove in a circumferential subsection.

Based on the above definition, at least two radial webs are positioned within the retaining shank groove in such a way that the retaining shank groove is filled with these radial webs. Based on this construction, a sealing ring is sectionally lifted out of the retaining groove by means of these radial webs, e.g. by two, three, four or more radial webs regularly circumferentially spaced to each other. This construction provides for a sufficient retaining force for the sealing ring, e.g. an O-ring, while transporting and/or positioning the blind rivet insert. At the same time, these radial webs slightly reduce the retaining force of the sealing ring within the retaining shank groove. This may be based on partly lifting the sealing ring out of the retaining shank groove by the radial webs, so that the positive fit between the retaining shank groove and the sealing ring is slightly dissolved in the regions of the radial webs. Thereby, the retaining force of the retaining shank groove may be adapted to a facilitated shifting of the sealing ring from the retaining groove into the annular under head groove by the component.

According to a further embodiment, the shank of the blind rivet insert comprises a polygonal outer cross-section, which may be a hexagonal outer cross-section, and the annular retaining shank groove is separated in the plurality of groove sections each individually positioned in a corner region of the polygonal shank.

The blind rivet insert may be used in combination with a polygonal outer shank shape. Thus, the shank has a hexagonal or a heptagonal or an octagonal cross section. Based on an angular cross section of the shank, the blind rivet insert may be placed in a non-rotating manner in a complementary shaped component opening. Furthermore, such an angular design of the shank facilitates the use of a tool to prevent or generate a rotation of the blind rivet insert.

The annular underhead groove and the annular retaining shank groove of the blind rivet insert may be separated by an intermediate securing edge, which may be a continuously extending securing edge. This intermediate securing edge may be adapted to form an installation hurdle and a de-installation hurdle for a sealing ring. Only during insertion of the blind rivet insert into a component opening, the opening's surrounding edge abuts the sealing ring placed in the retaining shank groove. The abutment may be realized at the complete circumference of the sealing ring in order to achieve a uniform shifting of the sealing ring into the underhead position. Based on the intermediate securing edge, the sealing ring may not be replaced by vibrations or part abutment during the bulk material processing or transport. Furthermore, the intermediate securing edge may be adapted to prevent a release of the sealing ring if positioned directly at the annular underhead groove. Thereby it is also supported that during setting the blind rivet insert into the component opening, the sealing ring is pressed into the annular underhead groove by the component.

The annular underhead groove may have a partially circular or a partially curvilinear cross-section for receiving the sealing ring in the compressed condition. Even if a sealing ring may have a circular or an angled or an elliptical cross section, a known O-ring having a circular cross section appears to be the most popular design of a sealing ring. To accommodate such a sealing ring in the annular underhead groove, the groove design may be formed as a half-pipe being similar to the sealing ring design in its cross sectional shape. Furthermore, the design of the underhead groove defines a receiving volume for the sealing ring which may be smaller or equal to the volume of the sealing ring to be received.

According to another embodiment, the blind rivet insert according to the above described embodiments comprises a sealing ring, such as an O-ring, which is arranged in the annular retaining shank groove. Further, the annular retaining shank groove may have a half-pipe design being adapted in size to the sealing ring or O-ring to be received.

The present disclosure furthermore comprises a component having an installation bore in which the blind rivet insert in combination with a sealing ring is mounted wherein a surrounding edge of the installation bore is clamped between the annular flange and a crimping bead of the blind rivet insert so that the sealing ring is compressed within the annular underhead groove. Based on the compressed arrangement of the sealing ring between the component and the bottom side of the annular flange, a liquid tight positioning of the blind rivet insert within the component opening may be achieved. Furthermore, based on the receiving volume of the annular underhead groove, the blind rivet insert guarantees a metal to metal contact between the flange and the component surface to ensure an effective mechanical connection strength of the blind rivet insert in the support or component.

In order to produce the above combination of the blind rivet insert and the component, the following setting method is used: inserting the blind rivet insert into the installation bore of a support or a component, while inserting, displacing the sealing ring from the annular retaining shank groove into the annular under head groove or directly below the bottom side of the bearing head by an edge of the installation bore, and deforming the blind rivet insert in lengthwise direction into a crimping bead and thereby clamping the component between the annular flange and the crimping bead, and compressing the sealing ring within the annular underhead groove.

4. BRIEF DESCRIPTION OF THE DRAWINGS

Figure 2:
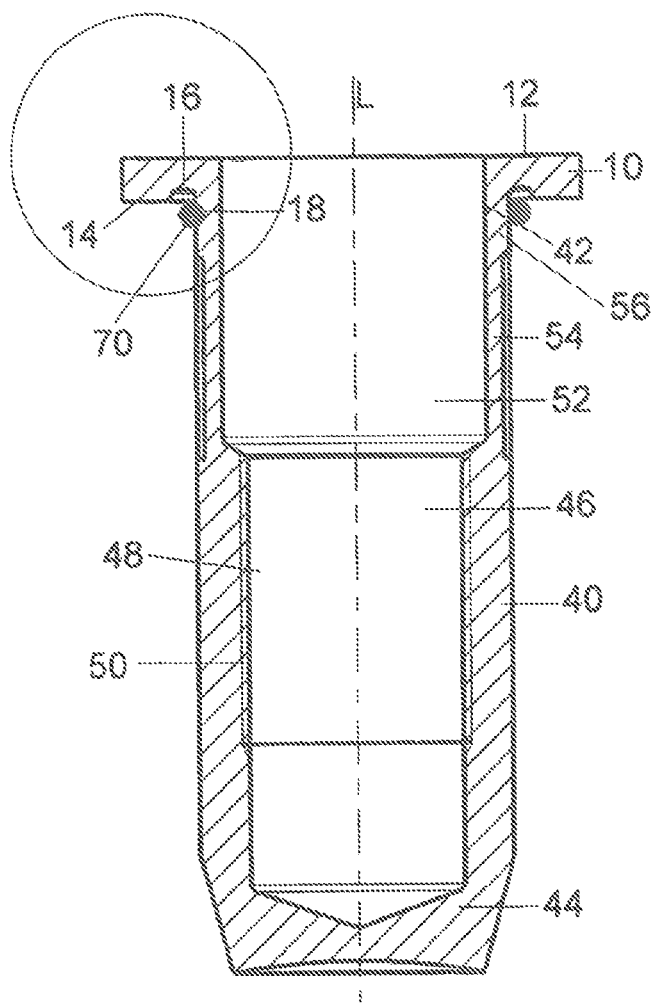
Figure 3:
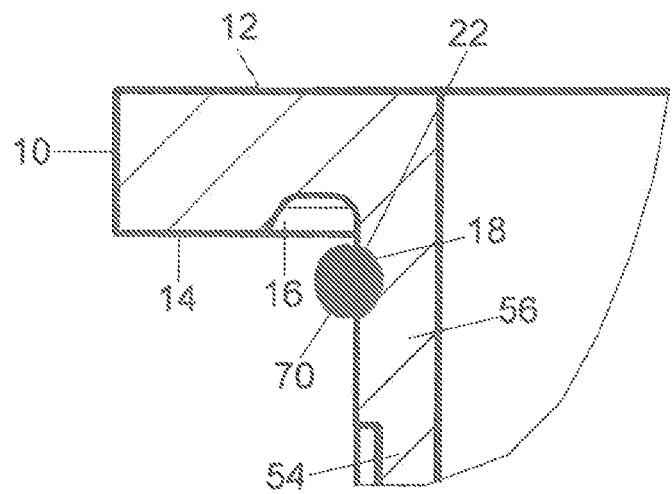
Figure 4A:
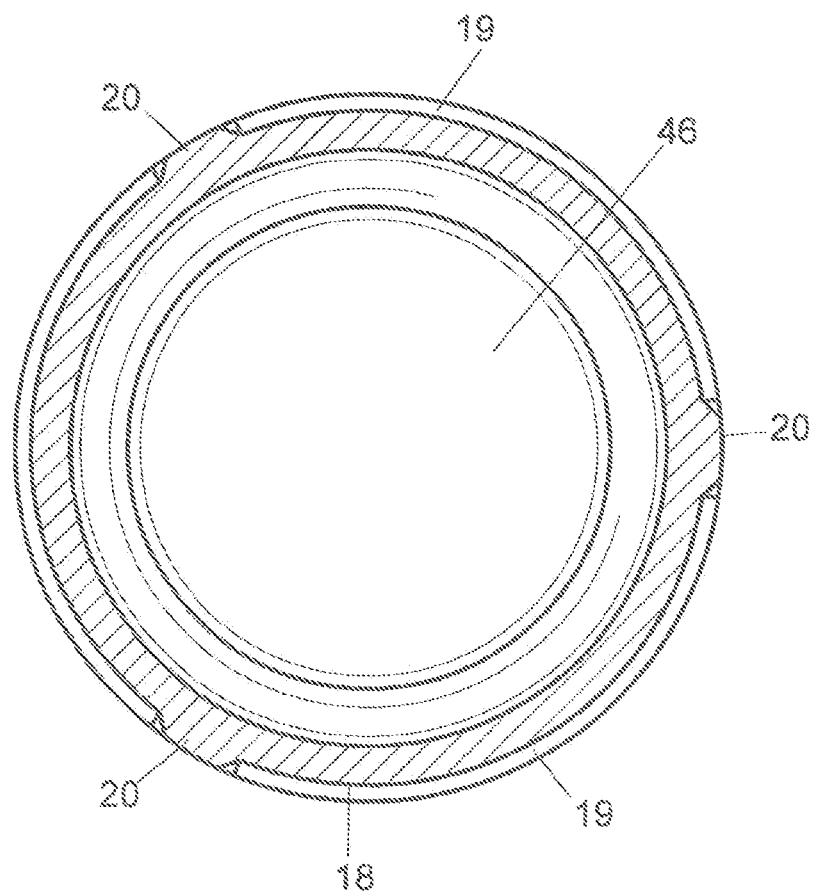

In the following, the present disclosure will be described in detail based on the drawings. Advantages and features will become apparent from the following description of specific embodiments and implementation embodiments of the disclosure given by way of non-limiting example and represented in the attached drawings, in which:

FIG. 1 shows a perspective view of a blind rivet nut representative of the group of blind rivet inserts, FIG. 2 shows a longitudinal sectional view of an embodiment of the blind rivet nut including a through bore having a cylindrical shape as well as a sealing ring which may be positioned in the only one annular retaining shank groove of the blind rivet nut, FIG. 3 shows an enlarged illustration of the circled area of FIG. 2, FIG. 4a shows a further embodiment of the blind rivet nut having a shank with a circular cross-section which may include an annular retaining shank groove with regularly arranged radial webs dividing the annular retaining shank groove wherein no sealing ring is arranged in the annular retaining shank groove.

Figure 4B:
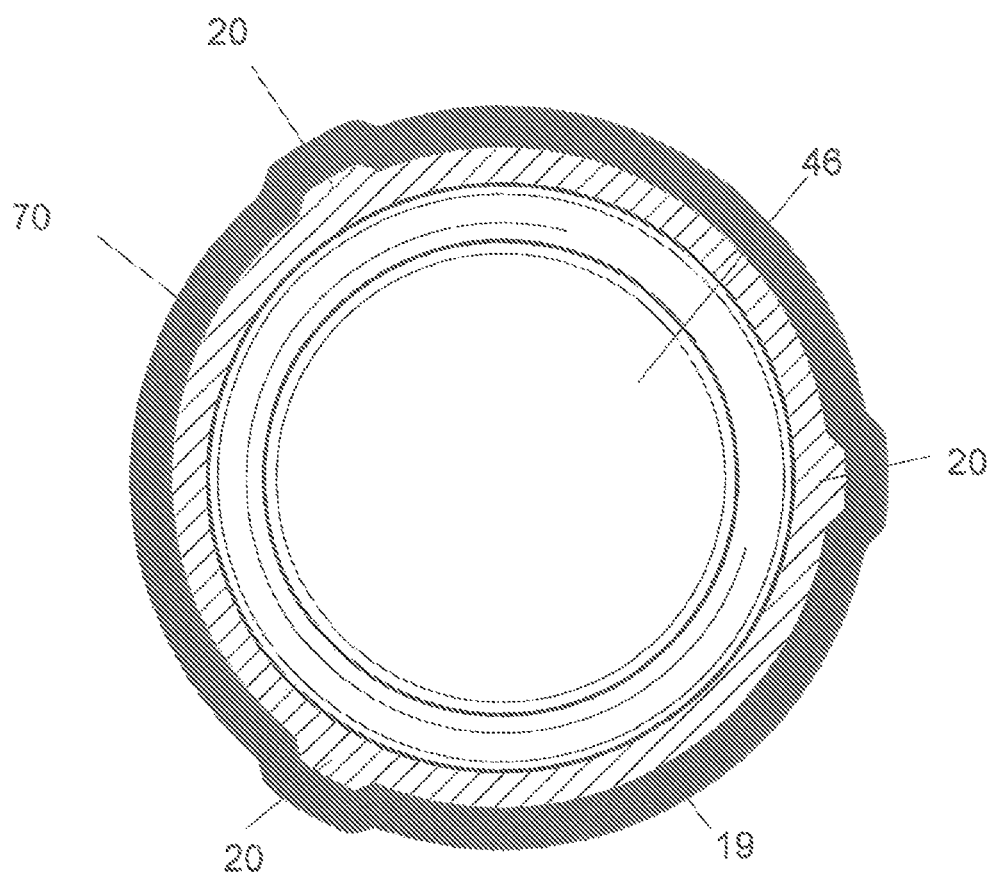
Figure 5:
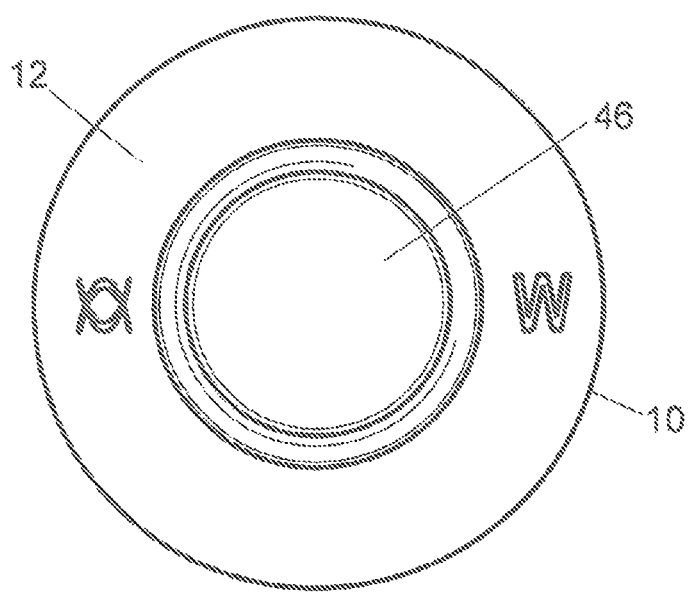
Figure 6:
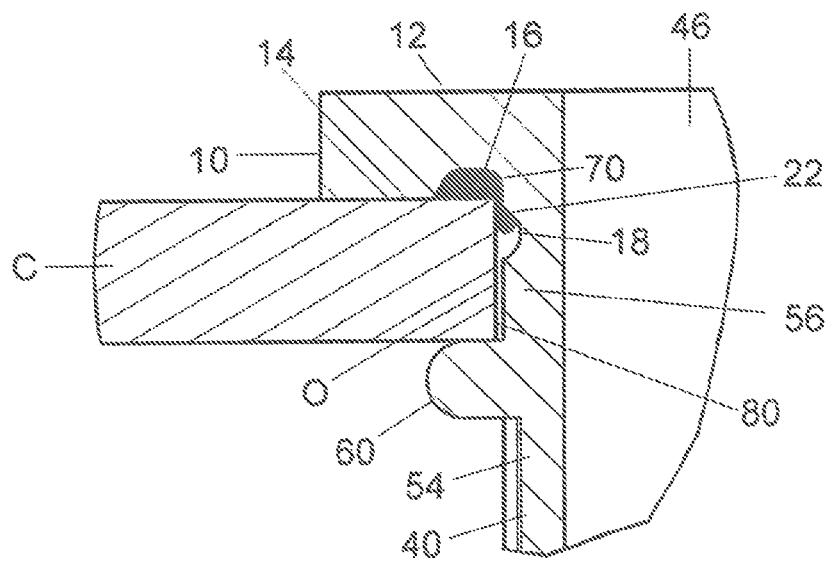
Figure 7:
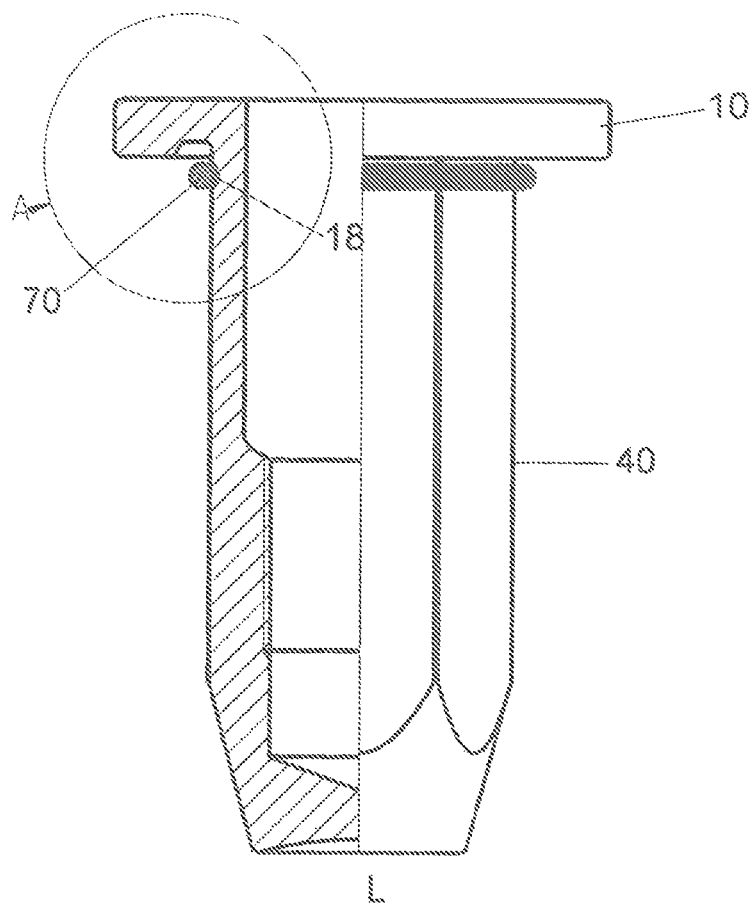
Figure 8:
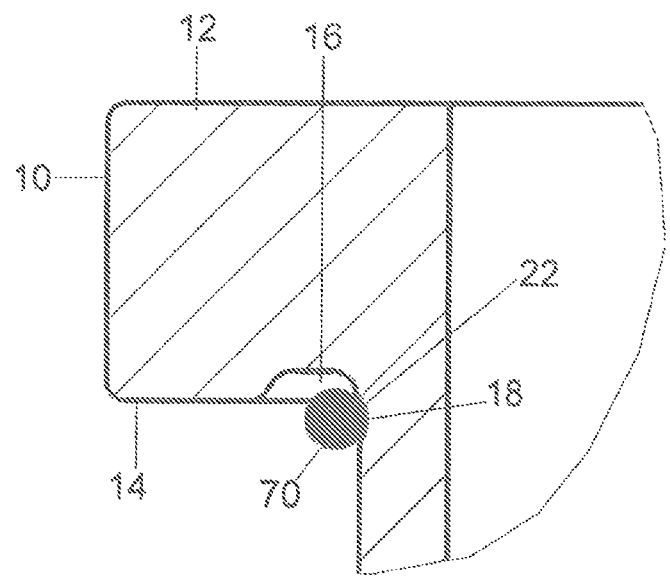
Figure 9:
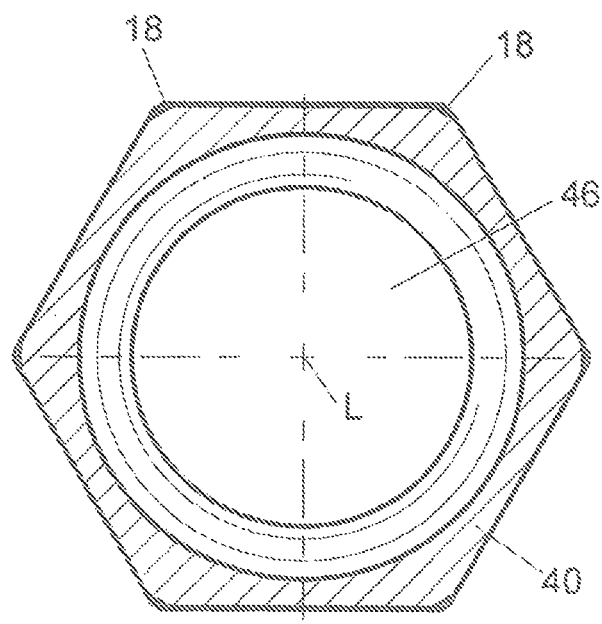
Figure 10:
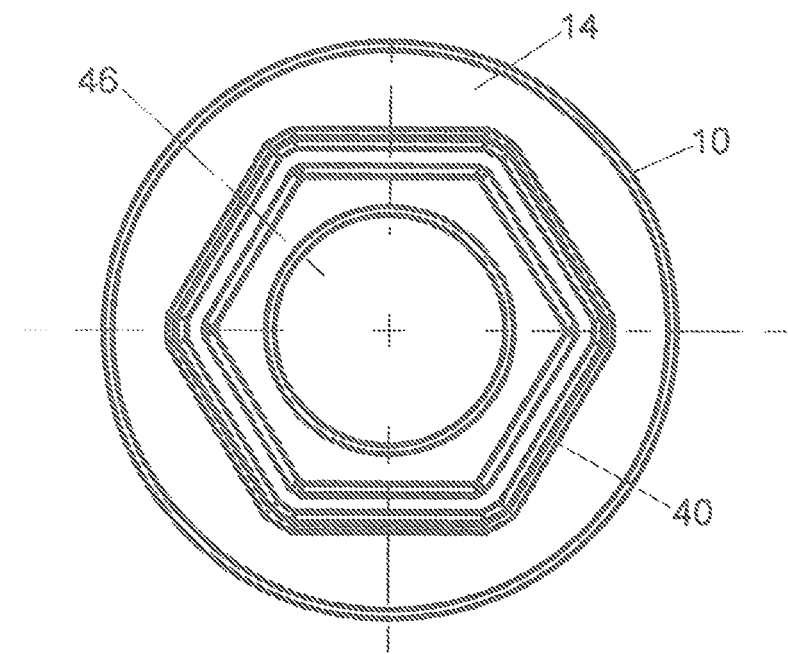
Figure 11:
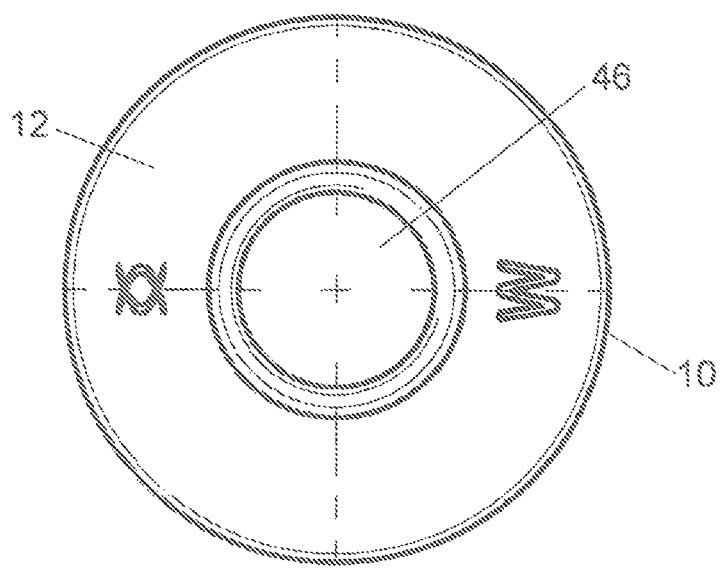
Figure 12:
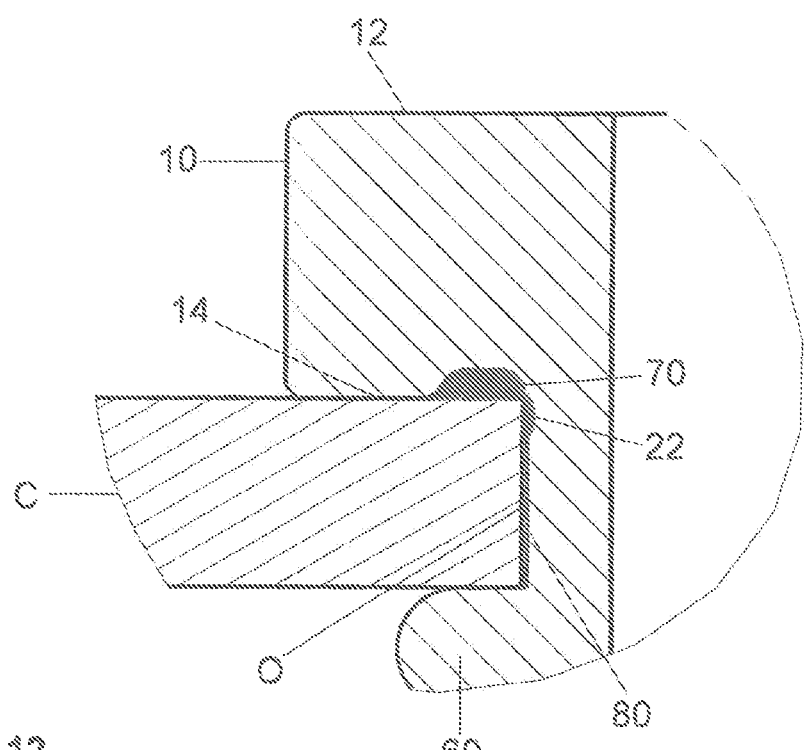
Figure 13:
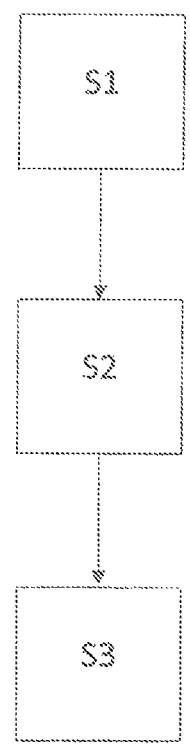

FIG. 4b shows the embodiment of FIG. 4a in which a sealing ring is arranged in the annular retaining shank groove, FIG. 5 shows an embodiment of a top view of the bearing head of the blind rivet nut, FIG. 6 shows an enlarged illustration of the blind rivet nut set into a component opening so that the component is fixed between the bearing head and a crimping bead of the blind rivet nut wherein a compressed sealing ring is retained within the underhead groove, FIG. 7 shows a longitudinal sectional view of an embodiment of the blind rivet nut having a polygonal shank as well as a sealing ring positioned in the annular retaining shank groove of the bearing head, FIG. 8 is an enlarged view of the circled area of FIG. 7 wherein a sealing ring is arranged in the retaining shank groove, FIG. 9 shows a radial sectional view of the polygonal shank of the blind rivet nut extending through the annular retaining shank groove, FIG. 10 shows a bottom view of the embodiment of the blind rivet nut according to FIG. 7, FIG. 11 shows a top view of the embodiment of the blind rivet nut according to FIG. 7, FIG. 12 shows an enlarged view of a connection between a component and the blind rivet nut having a polygonal shank, and FIG. 13 shows an embodiment of a setting method of the blind rivet insert according to the steps shown in the flowchart.

5. DETAILED DESCRIPTION

Referring to FIG. 1, it shows a blind rivet insert 1 having the configuration of the blind rivet nut. In the following, the disclosure related to the general group of blind rivet inserts will be described based on the construction details of the blind rivet nut 1.

According to FIGS. 1, 2 and 7 showing different embodiments of the present disclosure, the blind rivet nut 1 comprises an elongated body having a bearing head 10 and a shank 40. The elongated body extends along the central longitudinal axis L.

The bearing head 10 is positioned at a head end of the shank 40. The bearing head 10 is formed as an annular flange having a top side 12 and an underside 14, also denoted as a bottom side. The annular flange may extend symmetrically around the longitudinal axis L.

If the blind rivet nut 1 is fastened in a component opening O of the component C, as exemplarily shown in FIGS. 6 and 12, the underside 14 bears against the component surface. As described in more detail below, an edge and a surrounding of the opening O of the component C is clamped between the underside 14 of the flange 10 and a crimping bead 60 formed in a deformable region 54 of the shank 40.

According to a further embodiment of the blind rivet nut 1, the deformable region 54 of the shank 40 may have no constructive features facilitating or supporting a mechanical deformation for generating the crimping bead 60. In this context, the mechanical stability of the blind rivet nut 1 in the deformable region 54 may be weakened. To this end, constructive alternatives of the wall formation of the blind rivet nut 1 are used, e.g. reducing the radial wall thickness (see FIG. 2), incorporating a weakening knurling and/or circumferentially distributed recesses (not shown).

Furthermore, there may be a non-deformable region 56 between the underside 14 of the bearing head 10 and the deformable region 54 wherein the deformable region 54 is qualified by the formation of the crimping bead 60 (see FIGS. 2, 3, 6, 7). The non-deformable region 56 denotes an axial shank section starting from the underside 14 of the bearing head 10. The non-deformable region 56 extends through a component opening O of a component C. Based on the position within the component opening O, the non-deformable region 56 does not form a crimping bead 60 or deforms for fastening or sealing the blind rivet nut 1 within the component opening O. Thus, "non-deforming" denotes the presence of no or possible blind rivet nut deformations in this shank region only which do neither support nor are required for fastening or sealing the blind rivet nut 1 at the component C.

The shank 40 comprises a head end 42 which is arranged adjacent to the bearing head 10. A foot end 44 of the shank 40 is arranged opposed to the head end 42. Further, a cylindrical bore 46 extends coaxially to the longitudinal axis L from the head end 42 to the foot end 44.

The cylindrical bore 46 extends from the bearing head 10 and the head end 42 to the foot end 44 in lengthwise direction. Dependent on the configuration of the blind rivet nut 1, the foot end 44 may be open or closed to the outside, i.e. the cylindrical bore 46 forms a through bore or a blind hole.

The first bore segment 48 may extend near the foot end 44, which is provided with an internal thread 50. The internal thread 50 is adapted to receive a setting shaft or a fastening threaded bolt or a screw (not shown) having a complementary shaped external thread. By means of the setting shaft, the shank 40 may be compressed or clinched based on a known compressing motion of the shaft, thereby forming the crimping bead 60. After completion of the setting or crimping process, the blind rivet nut 1 is fastened within the opening O by clamping the component between the bearing head 10 and the crimping bead 60.

Near the head end 42, a second bore segment 52 is provided. The second bore segment 52 is qualified by a smaller wall thickness as compared to the first bore segment 48 including the inner thread 50. The reduced wall thickness of the second bore segment 52 facilitates in a known manner the formation of the crimping bead 60 due to its ability to deformation while setting or fastening the blind rivet nut 1 in the opening O of the component C. Based on the reduced wall thickness of the second bore segment 52, its inner diameter is greater as compared to the first bore segment 48.

According to a first embodiment as shown in FIG. 2, the shank 40 has the shape of a hollow cylinder with a circular cross-section. According to a further embodiment as shown in FIG. 7, the shank 40 may have the shape of a regular hexagonal prism. Further, it is conically pointed at its foot end 44 in the same manner as the cylindrical shank 40 of FIG. 2.

Although shown with a hexagonal shank 40, the blind rivet nut 1 may have different polygonal cross-sections not limited to a hexagonal shape. Owing to the hexagonal or polygonal outer contour, when the shank is placed in a suitably shaped bore adapted in size to the cross-section of the shank 40, rotation of the shank 40 in the bore 0 is prevented. The pointed end facilitates introduction of the shank 40 into the opening O. The bearing head 10 extends at right angles to the lengthwise axis L of the shank 40 and has the shape of a plane circular disc. Alternatively, the bearing head 10 may have a polygonal shape, for example, square or hexagonal.

Adjacent to the head end 42 of the shank 40 and according to one embodiment of the present disclosure, only one annular retaining shank groove 18 may be formed for receiving and retaining a sealing ring 70 (see FIGS. 2, 3, 7, 8). Furthermore, the at least one annular retaining shank groove 18 may be arranged within the non-deformable region 56. The sealing ring 70 may be made of a deformable material, e.g. plastic, elastomeric material, as natural or synthetic rubbers, or silicone. According to a further embodiment, two or three annular retaining shank grooves 18 may be formed in a close distance to the bearing head 10.

Further, the sealing ring 70 may have the configuration of an O-ring having a round or an elliptical cross section. The O-ring configuration may support the positioning and retaining of the sealing ring 70 within the annular retaining groove 18.

To this end, the sealing ring 70 may have an inner diameter being equal or smaller than an outer diameter of the shank 40 at the ground of the annular retaining groove 18. According to this sizing, the sealing ring 70 is reliably retained within the annular retaining groove 18 and it can be easily shifted from the annular retaining groove 18 into the annular underhead groove 16.

Furthermore, the sealing ring 70 has a material volume being greater than a groove volume which may be receivable within the annular underhead groove 16. Based on the volume adaption of the sealing ring 70 in regard to the annular underhead groove 16, the annular underhead groove 16 can be completely filled during a setting process of the blind rivet nut 1 within the opening O to achieve a sealed connection. Due to the larger volume of the sealing ring 70 as compared to the receiving volume of the underhead groove 16, additional sealing ring material may be displaced radially inwardly to the outer shank surface and into the opening O of the component C. Thereby, the sealing effect of the sealing ring 70 among the bottom side 14 of the bearing head 10, the outer surface of the shank 40 and the component C is increased.

As illustrated in FIGS. 6 and 12, the compressed and partially displaced material of the sealing ring 70 contacts different surface regions of the component C. While the bottom side 14 of the bearing head 10 may directly contact the component C, the material of the sealing ring 70 partly covers the component surface facing the bottom side 14 of the bearing head 10 as well as the inner surface of the opening O of the component C. Consequently, possible gaps resulting from diameter tolerances between the inner diameter of the opening O and the outer diameter of the shank 40 are sealingly filled with displaced material of the sealing ring 70.

To this end, the displaced material of the sealing ring 70 may be partly received in the annular underhead groove 16 and in the annular retaining shank groove 18 according to the embodiments.

To assure the retaining of the sealing ring 70 close to the annular underhead groove 16, the annular retaining shank groove 18 may be arranged within a retaining region of the shank 40. The retaining region of the shank 40 may start at the bottom side 14 of the bearing head 10 and has a maximum width corresponding to the thickness of the bearing head 10, i.e. the distance between the top side 12 and the bottom side 14. Based on the close combination of the annular retaining shank groove 18 and the annular underhead groove 16, the blind rivet nut 1 having the sealing ring 70 placed within the retaining groove 18 is effectively sealed during the setting and crimping process of the blind rivet nut 1 within the component opening O.

Referring to the blind rivet nut 1 having the shank 40 with a circular cross-section (see FIGS. 2 and 4), the annular retaining shank groove 18 has a partially circular cross-ssection. The retaining shank groove 18 may be semi-circular in a cross-sectional shape to be adapted to the outer shape of the sealing ring 70. Thereby, the sealing ring 70 is reliably retained within the retaining groove 18 during transport and processing of the blind rivet nut 1.

In order to fasten the blind rivet nut 1 in the opening O of the component C, the blind rivet nut 1 having the sealing ring 70 installed is first inserted into the opening O (step S1). Since the inner diameter of the opening O is closely adapted to the outer shank diameter of the blind rivet nut 1, only a small tolerance gap 80 exists between the inner wall of the opening O and the outer wall of the shank 40. In this context, "small" means that the tolerance gap 80 is smaller in size than the extension of the sealing ring 70 beyond the radial outer surface of the shank 40 adjacent to the annular retaining groove 18. As a consequence, the component C displaces in step S2 the sealing ring 70 out of the retaining groove 18 and to the bottom side 14 of the bearing head 10 during the insertion step S1.

Since the bottom side 14 of the bearing head 10 is pressed against the component C, the sealing ring 70 is forced into the underhead groove 16 and into the tolerance gap 80. At the same time, the shank 40 is partly deformed into the crimping bead 60 fixing the blind rivet nut 1 within the component opening O (step S3).

FIG. 4*a* shows a radial cross-sectional view of the shank 40 at the position of the annular retaining shank groove 18. According to a further embodiment, the annular retaining shank groove 18 may be separated by a plurality of radial webs 20. The radial webs 20 may extend radially outwardly starting from the ground of the annular retaining shank groove 18. Furthermore, the radial webs 20 may fill the annular retaining shank groove 18 in circumferential sub-sections thereby forming circular segments within the annual retaining shank groove 18. Thus, the retaining groove 18 can only partly or cannot receive the sealing ring 70 at the positions of the radial webs 20.

According to a further construction of the present disclosure, the plurality of radial webs 20 may be regularly distributed within the annular retaining shank groove 18. Further, three radial webs 20 may be circumferentially equally spaced with respect to each other as shown in FIG. 4. Four or five equally distributed radial webs 20 may be used. If the circumference of the shank 40 within the retaining groove 18 is extending or if the elasticity of the sealing ring 70 is rather low, more than three radial webs 20 may be used to support the displacement of the sealing ring 70 out of the retaining shank groove 18 to the underhead groove 16.

Between neighboring radial webs 20, the sealing ring 70 is retained within circumferentially extending partial sectors 19 of the retaining groove 18. Since the sealing ring 70 runs across the radial webs 20, it is partly positioned outwardly of the retaining groove 18 thereby decreasing the retaining force applied to the sealing ring 70 by the retaining groove (see FIG. 4b). Due to the radial outward position of the sealing ring 70 at the radial web positions, the component C abuts in an increased surface area the sealing ring 70 to realize the sealing ring displacement. Thus, the sealing ring 70 can be displaced more easily as compared to a retaining shank groove 18 having less or no radial webs 20.

FIG. 9 shows an embodiment of the shank 40 having a polygonal cross-sectional shape. Further, FIG. 9 illustrates a radial cross-sectional view of the shank 40 at the position of the annular retaining shank groove 18. Due to the polygonal shape of the shank 40, the retaining shank groove 18 only extends in the corner regions of the polygonal shank 40. The respective corner regions of the groove sections 18 retain the sealing ring 70 before displacement by the component C.

Referring to the embodiments of FIGS. 3, 6, 8, and 12, an intermediate securing edge 22 may be arranged between the annular underhead groove 16 and the annular retaining shank groove 18. The intermediate securing edge 22 extends continuously or sectionally around the shank 40. Further, the intermediate securing edge 22 may define a displacement hurdle for the sealing ring 70. Thereby, the sealing ring 70 is additionally supported in its preloaded position within the single annular retaining shank groove 18.

Finally, the FIGS. 6 and 12 show embodiments of a sealed connection between the blind rivet nut 1 and the component C. To this end, the blind rivet nut 1 having a circular (FIG. 6) or a polygonal shank 40 (FIG. 12) may be inserted into the component opening O and the shank 40 is compressed or crimped. Consequently, the deformation region of the shank 40 is deformed into the crimping bead 60 thereby clamping the component C between the bearing head 10 and the crimping bead 60. While the bottom side 14 of the bearing had 10 directly contacts the component C, the sealing ring 70 may be sealingly compressed and deformed within the underhead groove 16 and the retaining groove 18. In this context, the underhead groove 16 is adapted to not completely receiving the compressed sealing ring 70 thereby enabling the material displacement into the retaining groove 18.

The invention claimed is:

1. A blind rivet insert, comprising:
    a. a bearing head forming an annular flange and
    b. a shank extending from an underside of the bearing head and comprising a head end, a foot end and a cylindrical bore extending in lengthwise direction from the head end to the foot end, and having a first bore segment near the foot end, provided with an internal thread, and a second bore segment near the head end whose diameter is greater than the diameter of the first bore segment, the wall surrounding the second bore segment forming a deformable region of the shank, wherein
    c. the underside of the bearing head comprises an annular underhead groove concentrically arranged to the shank and adapted for receiving a sealing ring in a mounted condition of the blind rivet insert, and
    d. at least one annular retaining shank groove extends circumferentially around the shank, being arranged adjacent to the underside of the bearing head, for retaining the sealing ring in a preloaded position before mounting the blind rivet insert.

2. The blind rivet insert according to claim 1, wherein the bearing head has a flange thickness in the lengthwise direction of the blind rivet insert, and the annular retaining shank groove is positioned in a circumferential retaining region of the shank starting at the underside of the annular flange having a maximum width in lengthwise direction equal to the flange thickness.

3. The blind rivet insert according to claim 2, wherein the shank has a cylindrical outer wall comprising the annular retaining shank groove which has a partially circular cross-section.

4. The blind rivet insert according to claim 3, wherein the annular retaining shank groove is regularly separated by radial webs defining a plurality of circumferential partial sectors of the retaining shank groove.

5. The blind rivet insert according to claim 4, wherein the radial web extends in circumferential direction within the annular retaining shank groove thereby filling the annular retaining shank groove in a circumferential subsection.

6. The blind rivet insert according to claim 2, wherein the shank comprises a polygonal outer cross-section and the annular retaining shank groove is separated in the plurality of groove sections each individually positioned in a corner region of the polygonal shank.

7. The blind rivet insert according to claim 2, wherein the annular underhead groove and the annular retaining shank groove are separated by an intermediate securing edge.

8. The blind rivet insert according to claim 2, wherein the annular underhead groove has a partially circular or a partially curvilinear cross-section for receiving the retaining ring in the compressed condition.

9. The blind rivet insert according to claim 2, wherein the retaining shank groove is positioned in a non-deformable region of the shank between the bearing head and the deformable region of the shank.

10. The blind rivet insert according to claim 2, wherein the retaining shank groove is positioned in a retaining region directly beneath the underside of the bearing head wherein the retaining region has a maximum extension in axial direction from the underside of the bearing head of twice the longitudinal bearing head thickness.

11. The blind rivet insert according to claim 1, wherein the annular underhead groove and the annular retaining shank groove are separated by an intermediate securing edge.

12. The blind rivet insert according to claim 1, wherein the annular underhead groove has a partially circular or a partially curvilinear cross-section for receiving the retaining ring in the compressed condition.

13. The blind rivet insert according to claim 1, wherein the retaining shank groove is positioned in a non-deformable region of the shank between the bearing head and the deformable region of the shank.

14. The blind rivet insert according to claim 1, wherein the retaining shank groove is positioned in a retaining region directly beneath the underside of the bearing head wherein the retaining region has a maximum extension in axial direction from the underside of the bearing head of twice the longitudinal bearing head thickness.

15. The blind rivet insert according to claim 1, wherein a sealing ring is arranged in the annular retaining shank groove.

16. A component having an installation bore in which the blind rivet insert according to claim 15 is mounted wherein a surrounding edge of the installation bore is clamped between the annular flange and a crimping bead of the blind rivet insert so that the sealing ring is compressed within the annular underhead groove.

17. A setting method of a blind rivet insert according to claim 15 into an installation bore of a component, comprising the following steps:
   a. inserting the blind rivet insert into the opening,
   b. while inserting, displacing the sealing ring from the annular retaining shank groove into the annular underhead groove by an edge of the opening, and
   c. deforming the blind rivet insert in lengthwise direction into a crimping bead and thereby clamping the component between the annular flange and the crimping bead, and compressing the sealing ring within the annular underhead groove.

* * * * *